Oct. 17, 1961  H. E. STOVER  3,004,297
METHOD FOR FORMING A GASKET
Filed Aug. 12, 1958

INVENTOR.
HARRY E. STOVER
BY
ATTORNEY

United States Patent Office 3,004,297
Patented Oct. 17, 1961

3,004,297
METHOD FOR FORMING A GASKET
Harry E. Stover, Lancaster, Ohio, assignor to Anchor Hocking Glass Corporation, Lancaster, Ohio, a corporation of Delaware
Filed Aug. 12, 1958, Ser. No. 754,658
4 Claims. (Cl. 18—59)

The present invention relates to a method for forming a gasket and more particularly to the method for molding a gasket within a closure from a gasket blank inserted in the closure.

The increasing use of food products which are preferably packaged in hermetically sealed containers presents a continually growing demand for improved sealing closures which are easily and inexpensively manufactured. Such closures are provided with sealing gaskets made of rubber or other suitable sealing material. Where a saving is effected in the manufacture and application of the sealing gasket, the cost of manufacturing the closure is significantly reduced.

A preferred embodiment of the present invention illustrates molding a gasket in a closure of the type disclosed in the Harry E. Stover United States patent application Serial No. 687,035, filed September 30, 1957, and owned by the assignee hereof. It will be understood that the invention is not limited to this particular type of closure but is also applicable to other types of closures.

There are presently several methods of applying gaskets to closures. One such method comprises cutting a gasket from a vulcanized tube of sealing material and assembling the cut gasket into the closure.

Another method of applying a gasket to a closure comprises placing a slug of gasket material on the inside of a closure and thereafter utilizing a suitable die for shaping the gasket material into a gasket.

Another method of forming the gasket comprises cutting a ring from a slug or block of gasket material, placing the cut ring into a closure and applying pressure to the cut ring by a suitable die to shape the cut ring within the closure.

The present invention is an improvement over these methods and has for one of its objects the provision of an improved method for forming gaskets.

Another object of the present invention is to provide an improved method of forming a gasket which forms and separates a ring of gasket material from a gasket blank while simultaneously molding the ring of gasket material into shape so that the remaining gasket material may be removed and re-used.

Another object of the present invention is to provide an improved method of forming a gasket which will simultaneously form and separate a zone of gasket material from a gasket blank, shape the separated zone, and form an annular groove therein.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figure 1:
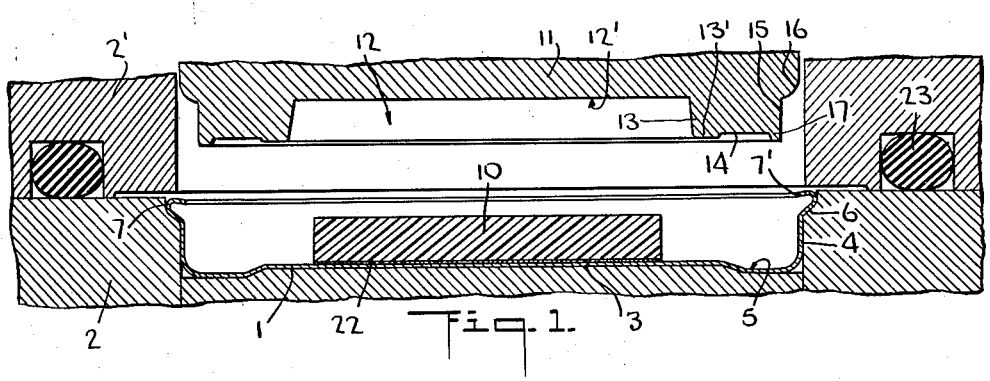
FIG. 1 is a sectional view showing a cup-shaped closure in a die having a gasket blank therein before the molding punch is pressed onto the gasket blank to form the gasket.

Referring more particularly to FIG. 1, a cup-shaped closure 1 is shown having a cover portion 3 and a depending skirt portion 4. The cover portion 3 is provided with a gasket-receiving channel 5 and the skirt portion 3 has an extending flared portion 6 with its edge 7 turned partially inwardly to form an inwardly directed flange 7'.

The cup-shaped closure 1 may be shaped into the desired form by first stamping the cup-shaped closure from a sheet of tin-plate or other suitable metal, coated with a suitable lacquer, and thereafter turning the edge of the skirt portion 4 inwardly to form the flange 7'.

Figure 2:
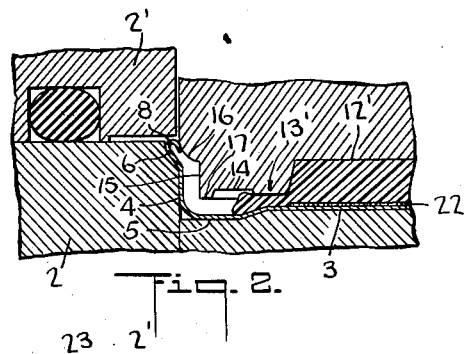
FIG. 2 is a view similar to FIG. 1 showing the initial position of the molding punch as it is being pressed into the gasket blank to force some of the gasket material toward the skirt portion of the closure.
Figure 3:
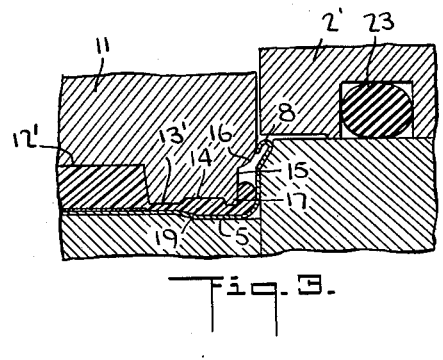
FIG. 3 shows the molding punch in a more advanced position forming and separating a peripheral zone from the gasket blank and forcing more of the gasket material toward the skirt portion of the closure.

A gasket blank 10 is placed inside the closure shell 1 on the cover portion 3. The diameter of the gasket blank 10 is preferably smaller than the diameter of a cavity 12 in the molding punch 11 to facilitate registry with it and the gasket blank 10 is slightly thicker than the depth of the cavity 12 so that when the punch 11 is lowered the gasket blank 10 will be received within cavity 12 and the upper wall 12' of the cavity 12 will strike the gasket blank and will force the gasket material into a suitable gasket-forming position (FIGS. 2 and 3). The gasket blank 10 may be a rubber compound, a synthetic compound, or any other suitable sealing material.

Figure 7:
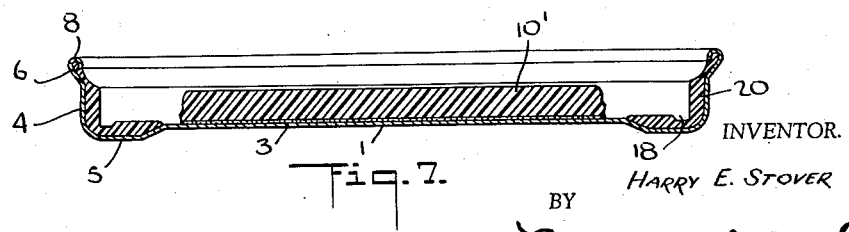
FIG. 7 is a sectional view of a closure showing the position of the remaining gasket blank after it has fully drawn itself away from the formed gasket.

The closure shell 1 with the gasket blank 10 therein is placed in a support member 2 positioned beneath the reciprocable molding punch 11 carrying a resiliently mounted sleeve 2' which is adapted to strike when the molding punch 11 is lowered on the support member 2 to form a tight seal. The molding punch 11 is provided with a projecting circumferential separating and shaping portion 13 adapted to cooperate with cavity 12 to force a portion of the gasket blank 10 into a peripheral ring to space or separate the formed ring from the gasket blank 10, and to shape the ring into a gasket 20 (FIG. 7).

The projecting circumferential separating and shaping portion 13 is provided with a separating, spacing, pinching or thinning surface 13', a horizontal shaping surface 14 and a vertical shaping surface 15. The vertical shaping surface 15 has a thickened portion 16 which is adapted to strike the inwardly extending flange 7' of the skirt 4 and to curl it into a bead 8 (FIG. 2). When the molding punch 11 is in its molding position (FIGS. 4 and 5) the thickened portion 16 also forms a tight seal with the open bead 8 to permit the gasket material to flow into the open bead 8 while preventing any of the gasket material from escaping from between the bead 8 and the punch 11.

If desired, the separating and shaping portion 13 of the molding punch 11 may be provided with a groove-forming extension 17 to form an annular groove 18 (FIG. 7) in the gasket. While the groove-forming extension 17 is illustrated in the drawings as being located at the outer edge of the horizontal shaping portion 14, it will be understood that the annular groove 18 may be eliminated, if desired, or it may be located at other positions, as desired, in which case the location of the groove-forming extension 17 will be changed accordingly.

The operation of the preferred embodiment is shown in FIGS. 2 to 6. The sealing ring 2' is first moved downwardly into position against the support 2 so that a ring gasket 23 forms an air-tight seal permitting the evacuation of air from the molding chamber where it is desired to do so.

The molding punch 11 is now moved downwardly until the upper wall 12' of the cavity 12 engages the gasket blank 10 and begins to depress it (FIG. 2). Since rubber or rubber-like gasket materials are incompressible, the gasket material is forced to flow into the gasket-receiving channel 5 to form the peripheral ring or zone 19 (FIG. 3). As the punch 11 is depressed further the gasket material continues to flow under spacing or separating surface 13', the horizontal shaping surface 14 and along the vertical shaping surface 15 to form a peripheral zone 19. The pressure of the upper wall 12' on the gasket blank 10 tends to stretch the rubber as it forces the rubber into the gasket-receiving channel 5 of the closure cap.

As the molding punch 11 is lowered to its lowermost position (FIG. 4), the upper wall 12' of the cavity 12 will have forced the rubber along the entire vertical shaping surface 15 and into the open bead 8 and will have forced the rubber to conform to the shape of the shaping surfaces 14 and 15. The rubber will also flow around the groove-forming extension 17 to simultaneously form the annular groove 18. The fact that the thickened portion of the vertical shaping surface 16 of the molding punch 11 forms a tight seal with the bead 8 of the closure prevents any of the gasket material from escaping (FIGS. 3 and 4).

Figure 4:
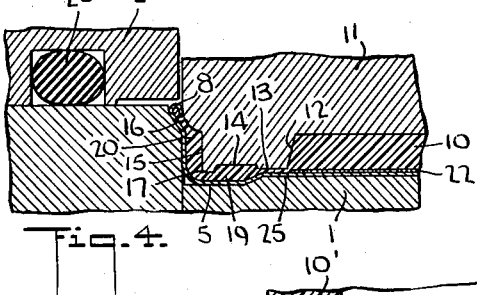
FIG. 4 shows the molding punch in its fully depressed position separating a peripheral ring of gasket material from the main gasket blank and simultaneously pressing the separated ring into shape.
Figure 5:
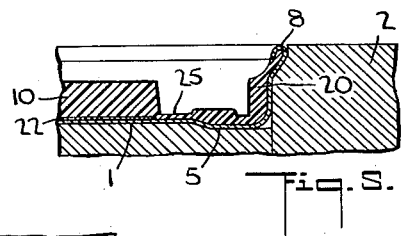
FIG. 5 is a sectional view showing the remaining gasket connected to the formed gasket by a thin annular zone of rubber.
Figure 6:
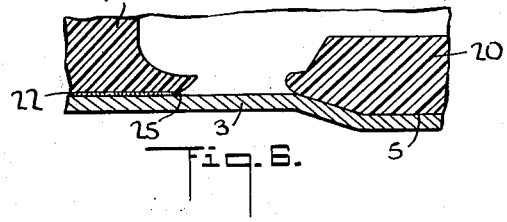
FIG. 6 is an exaggerated detailed view showing the action of the central portion of the gasket material in drawing away to sever the molded gasket ring from the remainder of the gasket blank.

The peripheral zone 19 is connected to the remaining gasket blank 10' by a thin strip of rubber 25 beneath the spacing or separating surface 13' (FIG. 4). Since the gasket blank 10 has been stretched or deformed during the preceding operations the memory characteristics of the remaining portions of the gasket blank 10' will cause it to contract when free to do so. Since the connecting strip of rubber 25 is very thin, this contracting action will tear or rupture the strip 25 and will separate the molded gasket 20 from the remaining gasket blank 10'. This action is illustrated in FIG. 6 where the strip of rubber 25 is shown drawn away from the formed gasket 20 and severed by the contracting action.

It will be noted that the punch 11 does not touch the metal of the cap. This prevents the coating of the cap from being scratched or marred and thereby prevents the metal from rusting.

After the rubber has contracted to sever the connecting strip 25, the remaining portion 10' of the gasket blank 10 can be removed from the closure for re-use in the manufacture of additional gasket blanks.

The portion of the underside of the cover of the closure registering with the cavity 12 of the shaping punch is preferably coated with a suitable compound 22 which will prevent the sealing compound pressed against it from bonding to it and to facilitate the easy removal of the excess compound. It is preferred that a silicone compound be used for this purpose but it will be understood that other compounds will serve this purpose. The lacquer tends to bond the gasket portion to the metal but, if desired, a bonding material may be applied to the inside of the skirt of the cap and to the peripheral portion of the cover above the basket. After the gasket 20 is completely shaped and the center portion removed, the gasket within the closure may be cured by placing the closure in an oven to vulcanize or partially vulcanize the sealing compound. If an unvulcanized or plastic type gasket is desired, the curing may be dispensed with.

While the separating edge 13' of the punch has been illustrated as flat in the preferred embodiment to leave a thin annular zone of rubber 25 between the gasket and the center blank, it will be understood that the width may be decreased if desired or a rounded annular bead or rib may be formed on the surface to facilitate the rupture of the thin annular zone of rubber.

It will be seen from the above that the invention will provide an improved mechanism and method for forming a gasket which permits a peripheral zone portion to be simultaneously formed, separated, and pressed into shape. The invention also permits the formation of a sealing groove in a single step and permits the remaining rubber material to be easily removed for re-use in forming additional gaskets. Since the molding punch does not touch the metal of the cap, the lacquer coating of the cap will not marred and thus will prevent the formation of rust.

As various changes may be made in the form, construction and arrangement of the parts and in the steps herein without departing from the spirit and scope of the invention and without sacrificing any of its advantages, it is to be understood that all matter herein is to be interpreted as illustrative and not in a limiting sense.

Having thus described my invention, I claim:

1. The method of molding a sealing gasket in a closure cap, which comprises coating the inside cover of said closure with a silicone compound, placing a gasket blank on the inside of said closure, applying pressure to compress the gasket blank and to force a portion of said gasket material along the skirt portion of the closure to form a spaced peripheral body, applying pressure to said peripheral body so that the peripheral body is attached to the gasket blank by a thin strip of gasket material and simultaneously pressing said peripheral body into a predetermined shape to form a gasket whereby the remaining gasket blank material will contract due to its memory characteristics to tear said thin strip of gasket material.

2. The method of molding a sealing gasket in a closure cap, which comprises placing a gasket blank on the inside of said closure, applying pressure to compress the gasket blank and to force a portion of said gasket material along the skirt portion of the closure to form a peripheral body, applying pressure to said peripheral body so that the peripheral body is attached to the gasket blank by a thin strip of gasket material and simultaneously pressing said peripheral body into a predetermined shape to form a gasket whereby the remaining gasket blank material will contract due to its memory characteristics to tear said thin strip of gasket material.

3. The method of molding a sealing gasket in a closure cap, which comprises coating the inside cover of said closure with a compound which will prevent adherence of gasket material to metal, placing a gasket blank on the inside of said closure, applying pressure to compress the gasket blank and to force a portion of said gasket material along the skirt portion of the closure to form a peripheral body, applying pressure to said peripheral body so that the peripheral body zone is attached to the gasket blank by a thin strip of gasket material and simultaneously pressing said peripheral body into a predetermined shape to form a gasket whereby the remaining gasket blank material will contract due to its memory characteristics to tear said thin strip of gasket material.

4. The method as claimed in claim 3, wherein an annular groove is formed in said peripheral body of gasket material simultaneous with the pressing of said peripheral body into a predetermined shape.

References Cited in the file of this patent
UNITED STATES PATENTS

| | | |
|---|---|---|
| 2,548,305 | Gora | Apr. 10, 1951 |
| 2,700,186 | Stover | Jan. 25, 1955 |
| 2,752,638 | Anspon | July 3, 1956 |
| 2,772,012 | Crabtree | Nov. 27, 1956 |
| 2,772,013 | Stover | Nov. 27, 1956 |
| 2,817,454 | Stover | Dec. 24, 1957 |